United States Patent [19]

Bard

[11] 3,985,118

[45] Oct. 12, 1976

[54] SOLAR FURNACE

[76] Inventor: Robert F. Bard, 1201 SW. Cardinell Drive, Portland, Oreg. 97201

[22] Filed: June 9, 1975

[21] Appl. No.: 585,231

[52] U.S. Cl. .................................. 126/271; 126/270
[51] Int. Cl.[2] ............................................ F24J 3/02
[58] Field of Search ............. 126/270, 271; 237/1 A

[56] References Cited
UNITED STATES PATENTS

| | | | |
|---|---|---|---|
| 1,220,091 | 3/1917 | Goff .................................. | 126/271 |
| 2,182,222 | 12/1939 | Courtis et al. ....................... | 126/270 |
| 2,460,482 | 2/1949 | Abbot ................................. | 126/271 |
| 2,920,710 | 1/1960 | Howard .............................. | 126/270 |
| 3,200,820 | 8/1965 | Garrett ............................... | 126/271 |

*Primary Examiner*—Kenneth W. Sprague
*Attorney, Agent, or Firm*—James D. Givnan, Jr.

[57] ABSTRACT

A solar furnace wherein multiple Fresnel lenses focus light rays upon heat conductors associated with each of the lenses. Each heat conductor has an exposed arcuate portion which serves to mount lens supporting means permitting pivotal movement of said supporting means about the conductor to maintain the lens focus in common with a portion of the conductor. Fluid passing through the vessels is heated to the extent that same may be used for powering a steam turbine associated with an electrical generator. To provide a self-contained, transportable generating system the solar furnace may be incorporated into a structure mounting additional components providing for condensation of the steam and recirculation to the solar furnace vessels.

13 Claims, 8 Drawing Figures

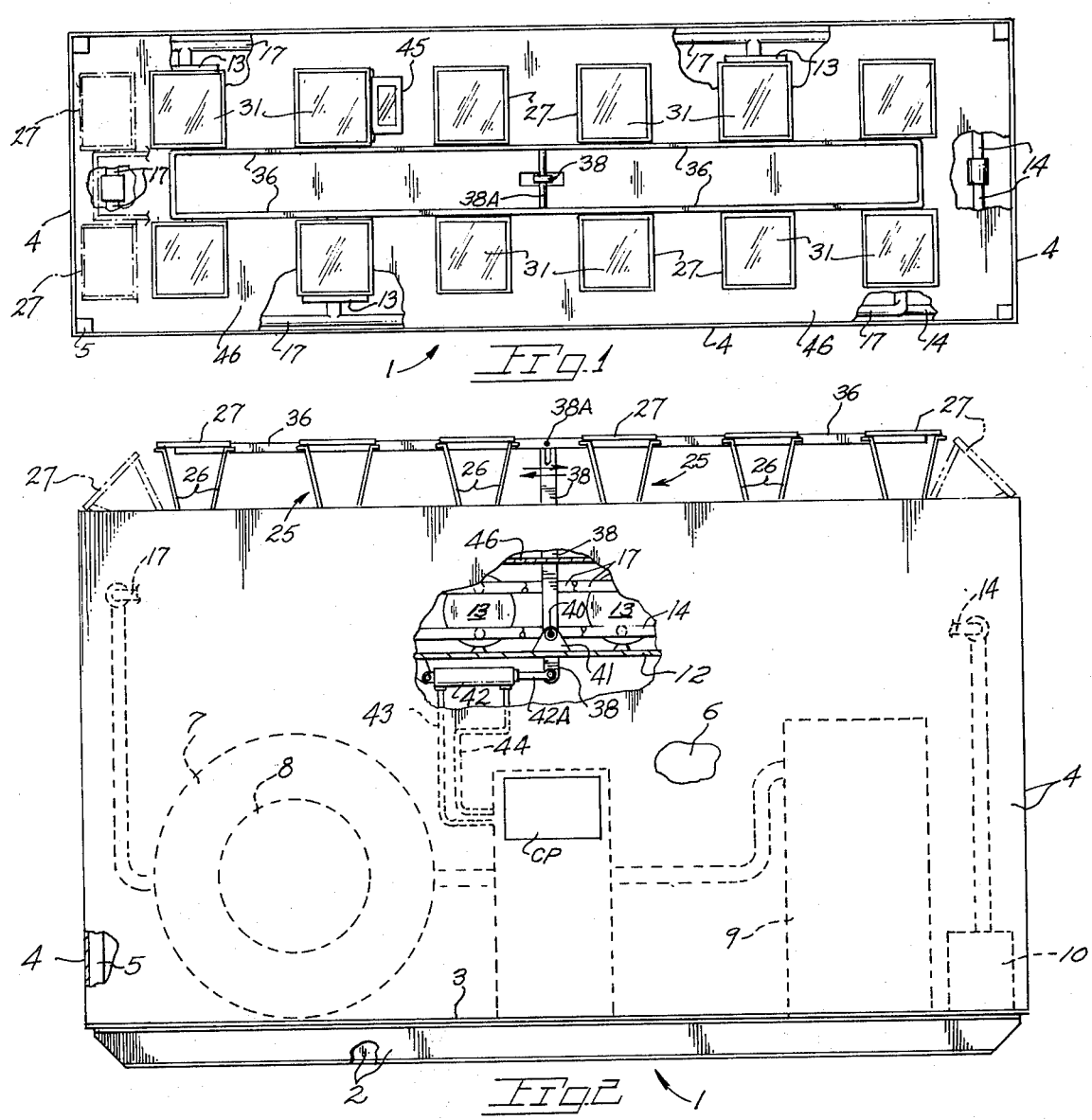
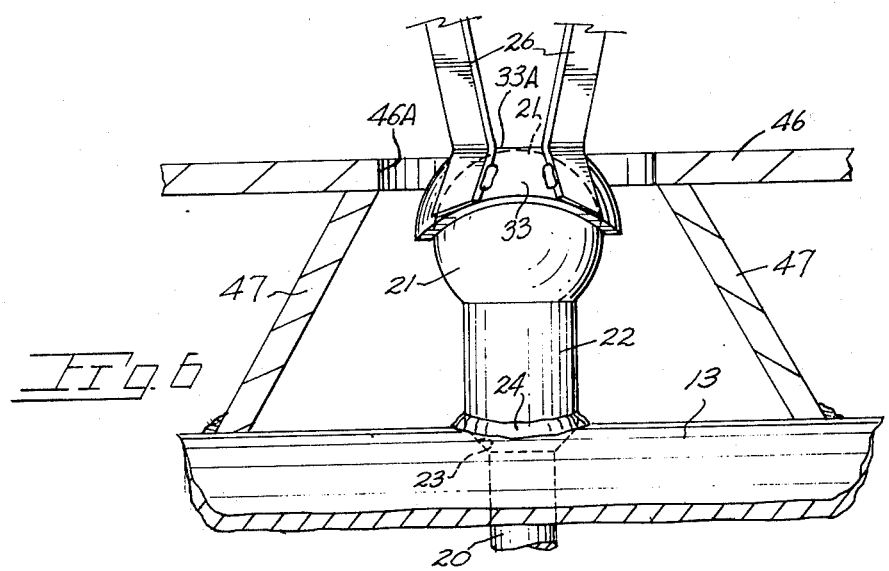

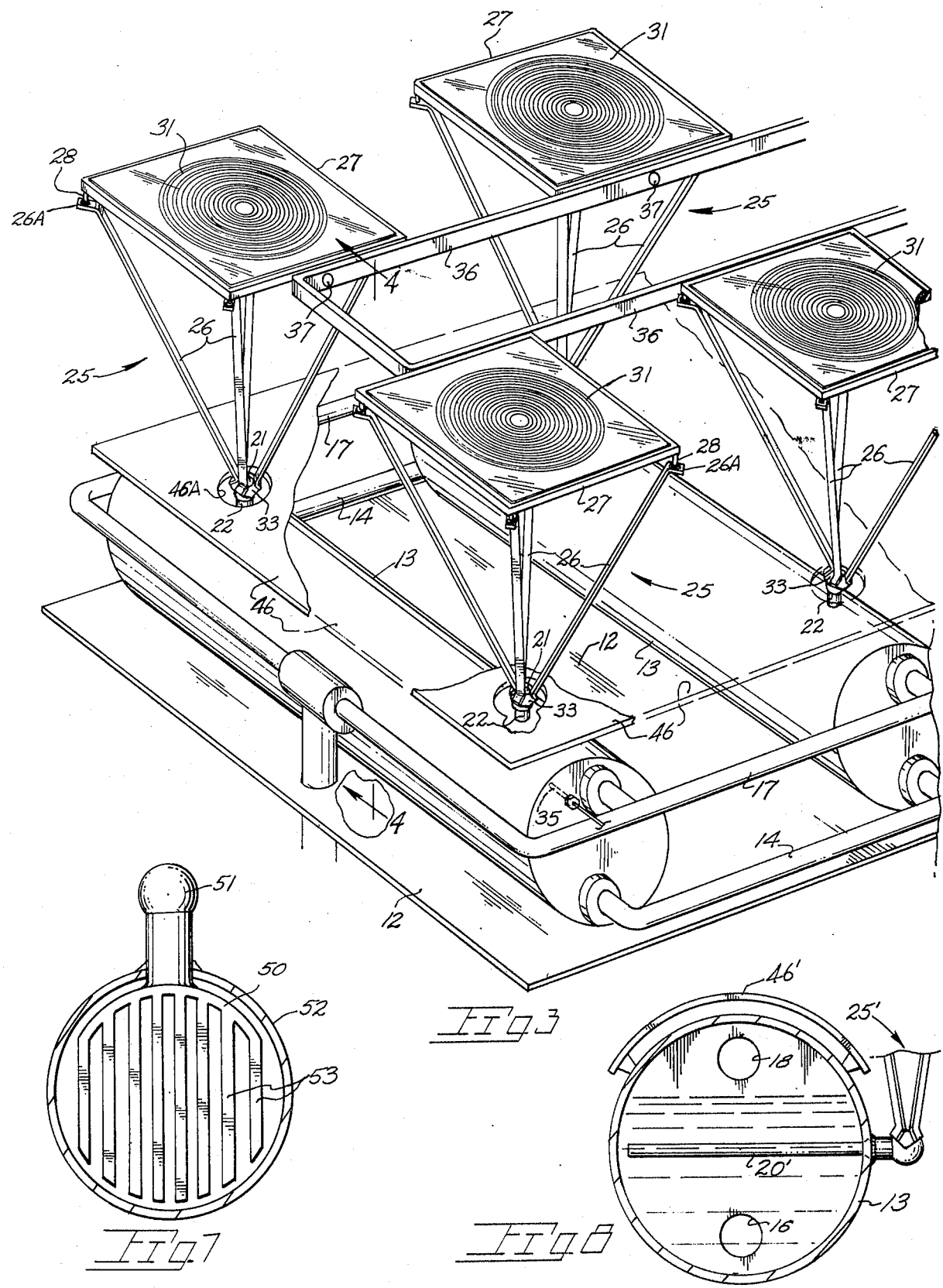

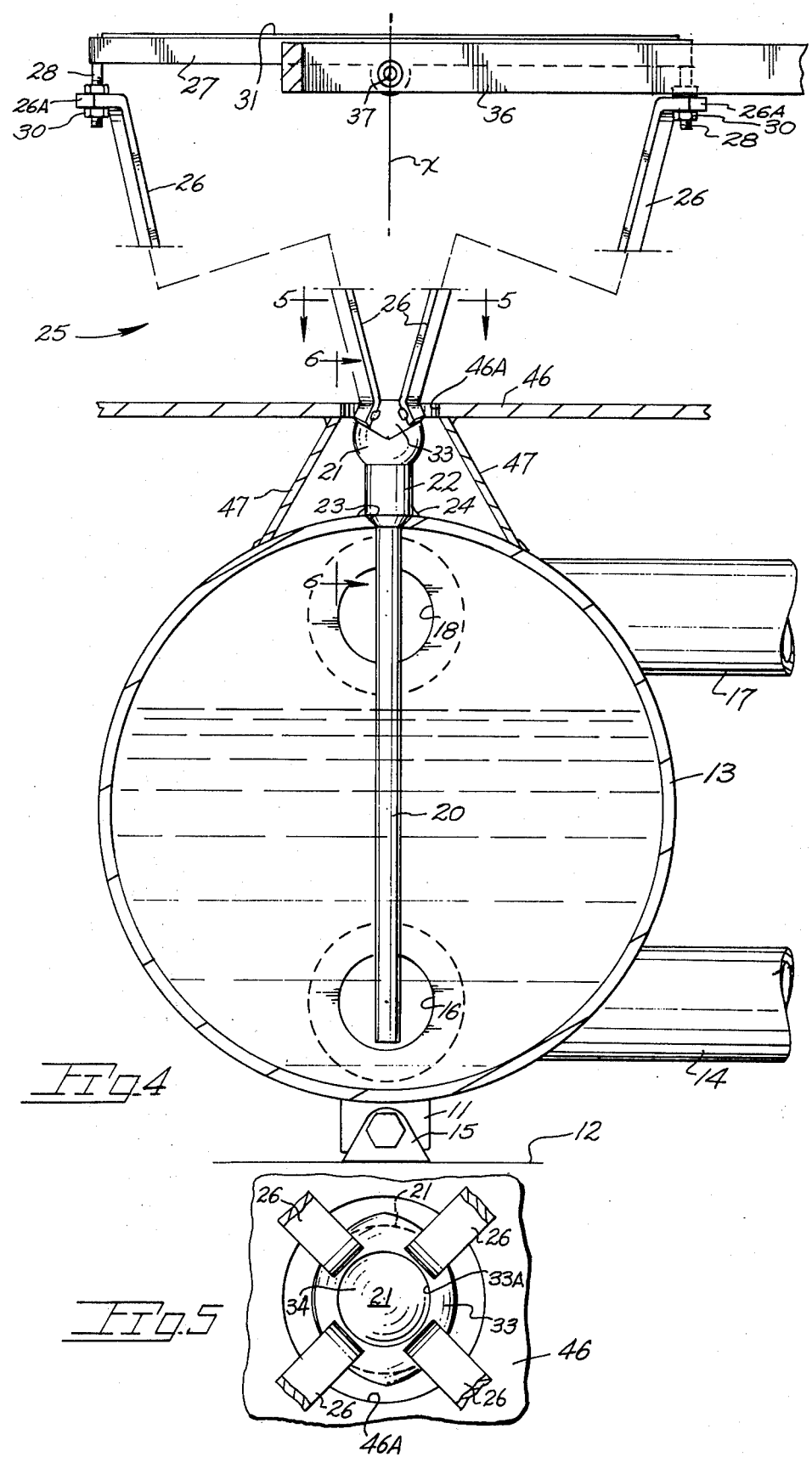

SOLAR FURNACE

BACKGROUND OF THE INVENTION

The present invention relates generally to solar furnaces and more particularly to one particularly suited to heating a transient fluid flow. Solar furnaces as presently known, incorporate complex lens or reflector arrangements for converging solar rays. Such arrangements usually include a battery of lenses mounted in a movable manner by complex assemblies necessary to accomplish continuous convergence of light rays toward some type of heat exchanger. Lenses used are of biconvex nature and hence of substantial cost which, along with their complex support assemblies, renders the solar furnace impractical for use other than for very large size installations or experimental uses.

SUMMARY OF THE INVENTION

The present invention is embodied within a solar furnace wherein fluid flows through vessels are heated by heat conductors which serve additionally to support a lens assembly in a positionable manner. The solar furnace produces a heated flow of fluid which, in one embodiment, is steam for powering an electrical generator. The present solar furnace enables an electrical power generating system to be self-contained in a highly compact manner rendering the system suitable for transport to a temporary or permanent use site. Other applications of the heated fluid flow, whether it be liquid or gaseous, are also later enumerated.

The heat conductors extend into their respective vessels while an exposed end of each conductor supports the lens assembly for sun tracking movement about at least one axis. A heat barrier serves to prevent undesired heat loss from the vessels. A pivotal connection between the lens assemblies and their respective heat conductors additionally serves to admit solar rays onto the heat conductor.

Important objects of the present invention include the provision of: a solar furnace having multiple vessels or tanks each having a fluid flow heated by one or more conductors in turn heated by converging solar light rays; a solar furnace wherein heat conductors additionally serve to support a lens assembly positionable about the conductor during apparent travel of the sun; a solar furnace wherein a heat conductor and a lens assembly are coupled in a manner permitting movement about an axis passing through or in proximity of the heat conductor; a solar furnace utilizing lenses of the Fresnel type converging light rays toward a focus in common disposition with a portion of the heat conductor; a solar furnace lending itself to incorporation within a self-contained power generating system to provide a unitary generating system for electrical power capable of transport to a temporary or permanent site of operation.

BRIEF DESCRIPTION OF THE DRAWINGS

In the accompanying drawings:

FIG. 1 is a top plan view of a solar powered generator structure,

FIG. 2 is a front elevational view of FIG. 1,

FIG. 3 is a fragmentary, perspective view of a solar furnace removed from the solar powered generator structure, FIG. 4 is an elevational view taken along line 4—4 of FIG. 3 showing sectioned furnace components, FIG. 5 is a sectional view taken downwardly along line 5—5 of FIG. 4 showing details of a pivotal connection between a lens assembly and subjacent heat conductor, FIG. 6 is an elevational view taken approximately along line 6—6 of FIG. 4 disclosing heat conductor and lens supporting means details, FIG. 7 is an end view of a heat conductor modified to impart heat to a passing airflow, and FIG. 8 is a vertical, sectional view of a modified form of tank and heat conductor combination.

DESCRIPTION OF THE PREFERRED EMBODIMENT

Subject matter, hereinafter disclosed, was recorded in the U.S. Patent Office under Disclosure Document No. 39,127 filed Mar. 17, 1975.

With continuing reference to the accompanying drawings wherein applied reference numerals indicate parts similarly identified in the following description, the reference numeral 1 indicates generally a solar powered generator structure adapted for unitary transport to a temporary or permanent using site. The structure includes a base 2 consisting of lengthwise extending I-beams and floor 3 providing rigidity to the structure permitting same to be readily transported. Walls at 4 are supported by upright structural members 5 the walls defining an equipment bay 6 for the following described generating system components. A turbine 7 drives a generator 8 with a condenser tank indicated at 9. A pump 10, suitably powered, draws fluid from the condenser tank for delivery through a manifold system later described.

It will be realized that while the system shown is for generating electrical power other uses of the heat produced by the following described solar furnace are equally feasible.

Indicated at 12 is a raised, furnace floor on which vessels or tanks 13 are mounted. Lugs at 11 (FIG. 4) are bolted within floor mounted clevises 15. Serving tanks 13 are a pair of inlet manifolds 14 which communicate pump 10 with the lower portion of each tank via manifold branches each terminating within tank openings as at 16. A pair of exhaust manifolds at 17 similarly extend across the tank ends with manifold branches communicating an exhaust opening as at 18, in the upper portion of each tank end, with each exhaust manifold. For purposes of regulating the fluid level of the tanks, one of the tanks may mount float actuated control in circuit with motor means powering pump 10.

A solar furnace, best viewed in FIGS. 3 through 6, includes the aforementioned tanks or vessels 13 with each tank mounting at least one heat conductor 20. Said conductor is of high heat conductivity such as that afforded by copper and includes a head 21 located exteriorly adjacent the tank well. An enlarged portion 22 of the heat conductor is sealed within a tank opening 23 as by a circumferential weld 24.

With attention to the head end 21 of conductor 20, the same is of rounded configuration shown in the present embodiment as being spherical but which could be of other shape, e.g. cylindrical, if so desired and depending upon the pivotal motion desired. The curvilinear surface of the conductor head 21 serves to mount, in a movable manner, the lower end of a lens assembly indicated generally at 25 as later elaborated upon. Said assembly includes lens support means 26 in the form of angulated frame members jointly supporting at their uppermost out turned ends at 26A a lens frame 27. Studs at 28 extend through the outwardly directed ends 26A of each support and are adjustably locked thereto by nut elements 30 to provide lens adjustment means. Seated in place within each lens frame 27 is a lens 31 which is of the Fresnel type which is suitably secured within frame 27 in any acceptable manner such as by detachable clips not shown.

The lens assembly further includes a bearing member at 33 to which is secured, as by welds, the lower ends of the support members 26. Said bearing member movably engages the exterior surface of conductor head 21 to constitute a pivotal connection of the ball and socket type and thereby permits lens assembly 25 to move about the conductor head while the converging rays from lens 31 impinge upon conductor head 21. Bearing member 33 is truncated at 33A to define an aperture 34 through which converging light rays pass toward a focal point in or in close proximity with conductor head 21 for efficient heating of same by solar radiation regardless of the inclined relationship of lens assembly 25 to the conductor. Control means positions each lens assembly 25 as later described. Heat imparted to the upper or exposed end of the conductor head 21 is transmitted lengthwise to the submerged portion of the conductor as viewed in FIG. 4, with the temperature sufficient to generate steam from water within vessel 13.

Vessels 13 function in the nature of boilers with steam being exhausted through tank apertures 18 and into exhaust manifolds 17. Each vessel 13 additionally mounts a heat sensor such as a thermocouple 35 to provide a temperature signal to a control panel at CP. The flow of steam resulting from each vessel, so pressurized, enters the exhaust manifolds 17 and ultimately impinges against the blades of turbine 7. It will be obvious that the steam generated by the present solar furnace may be otherwise used as for example in the heating of a building structure or powering other equipment. Similarly, while a liquid flow is shown being routed through the vessels, the fluid flow could be gaseous such as heated air with the conductors including baffles through which the air flows as later described in conjunction with the description of FIG. 7.

For positioning the lens assemblies about their respective conductors, control means are provided including an actuating bar 36 coupled to each lens assembly by a pivotal coupling 37. The control bar is shifted to simultaneously incline each lens assembly from the upright position shown to one where the lens assembly axis X is inclined for the purpose of optimum lens positioning. An arm 38 of the control means is rockably mounted at 40 between a pair of arm supporting plates 41. A hydraulic cylinder 42 extends or retracts a piston rod 42A to impart arcuate travel to arm 38 and a cross-arm 38A to rock bar 36 and hence each lens assembly 25 so that each lens 31 may follow the apparent travel of the sun. Hydraulic lines 43 and 44 are in fluid circuit with a valve control actuated in response to signals from a computer in control panel CP having an input from a sensing device at 45 mounted on a lens frame to permit tracking movement of the lens assemblies.

To prevent excessive heat loss from tanks 13, a heat barrier 46 overlies the tanks and defines openings 46A through which the lower end of each lens assembly passes. If so desired, instead of a common heat barrier, a separate barrier may be provided each tank to lessen heat loss. Heat barrier 46 is spaced from each tank by a weldment 47 which additionally serves to limit heat loss from the head end of conductor 20.

In FIG. 7, I show a modified heat conductor at 50 having a head portion 51 in heat exchanging relationship with a gaseous flow passing through a tank or vessel 52 which may be in communication, for example, with the heat ducts of a building structure. Elongate fins at 53 of the heat conductor, viewed endwise in FIG. 7, heat the gaseous flow moving therepast the heat resulting from solar rays focused on conductor head 51 by the earlier described lens and lens supporting arrangement.

With attention to FIG. 8, a heat conductor at 20' is disposed horizontally within a tank 13 so as to cause its interior portion to be fully submerged. The lens assembly at 25' is as earlier described.

While I have shown but a few embodiments of the invention it will be apparent to those skilled in the art that the invention may be embodied still otherwise without departing from the spirit and scope of the invention.

Having thus described the invention what is desired to be secured under a Letters Patent is:

1. In a solar furnace, the improvement comprising, a vessel through which a fluid flow may pass, a heat conductor associated with said vessel and in heat exchanging relationship with the fluid flow therewithin, said heat conductor having a portion external of the vessel,
a lens focusing solar rays toward said external portion of the heat conductor,
means supporting the lens in spaced relationship to said heat conductor,
control means imparting tracking movement to said lens supporting means, and
said lens supporting means in movable engagement with said heat conductor permitting movement of the lens about the external portion of the heat conductor whereby the focused solar rays will continuously heat said conductor.

2. The invention claimed in claim 1 wherein said lens is of the Fresnel type, and wherein said vessel is of elongate shape having multiple heat conductors spaced therealong, each of said heat conductors being of metallic construction.

3. The invention claimed in claim 2 wherein the external portion said heat conductor and said lens supporting means jointly embody a pivotal connection.

4. The invention claimed in claim 3 wherein said pivotal connection is of the ball and socket type, said socket apertured to admit solar rays for convergence toward the ball component.

5. The invention claimed in claim 1 wherein that portion of the heat conductor within said vessel is of baffle configuration for effective heat radiation to a passing flow.

6. The invention claimed in claim 5 wherein said lens supporting means includes multiple adjustment means enabling precise positioning of the lens focus within the heat conductor.

7. The invention claimed in claim 1 additionally including a heat barrier disposed adjacent said vessel.

8. A solar furnace comprising in combination, vessels through which fluid flows pass toward a common discharge,
heat conductors spaced along each of said vessels, at least a portion of each conductor disposed in the path of converging solar rays for solar heating, lens assemblies including a lens and lens supporting means operatively associated with each of said heat conductors, said lens supporting means mounted for rotational movement about that portion of the heat conductor in the path of the converging solar rays, control means coupled to said lens assemblies and imparting uniform movement to same about at least one axis whereby the light rays will converge toward said portion during apparent travel of the sun to heat the fluid flow.

9. The solar furnace claimed in claim 8 wherein each of said lens assemblies and their respective heat conductor jointly embody a pivotal connection.

10. The solar furnace claimed in claim 9 wherein said pivotal connection comprises cooperating bearing members, one of said bearing members of each pivotal connection being apertured for the passage of converging light rays.

11. The solar furnace claimed in claim 10 wherein said bearing members are of the ball and socket type with said socket being apertured for light ray passage.

12. The solar furnace claimed in claim 11 wherein each of said heat conductors additionally includes a portion of baffle configuration disposed interiorly of a vessel.

13. The solar furnace claimed in claim 11 additionally including a heat barrier disposed in spaced relationship to the vessel, said heat barrier apertured to admit passage therethrough of a lens assembly.

* * * * *